(12) United States Patent
Derby et al.

(10) Patent No.: US 6,181,792 B1
(45) Date of Patent: Jan. 30, 2001

(54) COMMUNICATION INTERFACE HAVING SYNTHESIZED MATCHING IMPEDANCES FOR DIFFERENT FREQUENCY BANDS AND A DESIGN METHOD THEREFOR

(75) Inventors: Jeffrey Haskell Derby, Chapel Hill; David Ross Thomas, Apex, both of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 09/013,363

(22) Filed: Jan. 23, 1998

(51) Int. Cl.[7] .................................................. H04M 1/76
(52) U.S. Cl. ............................................ 379/398; 379/394
(58) Field of Search .................................... 379/394, 398, 379/399, 387, 402–406, 441, 442

(56) References Cited

U.S. PATENT DOCUMENTS

| | | | |
|---|---|---|---|
| 4,351,060 | 9/1982 | Treiber | 375/12 |
| 4,359,609 | 11/1982 | Apfel | 179/16 F |
| 4,381,561 | 4/1983 | Trieber | 370/24 |
| 4,894,864 | 1/1990 | Cook | 379/398 |
| 4,961,219 | 10/1990 | Patel | 379/398 |
| 5,500,894 | 3/1996 | Hershbarger | 379/399 |
| 5,602,912 | * 2/1997 | Hershbarger | 379/402 |

* cited by examiner

Primary Examiner—Wing F. Chan
(74) Attorney, Agent, or Firm—Daniel E. McConnell

(57) ABSTRACT

A communication interface and a design method therefor provide a synthesized terminating impedance matching different frequency bands on a communication circuit. In some cases, for example based on specified network requirements in a particular country, the terminating impedance presented by the interface must have different frequency characteristics for received signals in different bands of frequencies. A transconductance amplifier and feedback loop provide the terminating impedance for signals received from the communication circuit and serves as a source impedance for signals transmitted by the interface to the telephone line. Signals with different frequencies will generally be received from the telephone line. These different characteristics are realized using different filter networks in the feedback loop. Each network provides a matching terminating impedance to the communication circuit according to the frequency band applied to the circuit. The network shapes the synthesized impedance based upon the relation $Z=1/G_m H$ where $Z=$ the terminating impedance; $G_m$ is the transconductance of the amplifier and H is the transfer function of the feedback network. For multiple frequencies on the telephone line, multiple networks are included in the feedback loop. Each network is designed to match the impedance requirements of a frequency band without affecting the terminating impedance and frequency band of the other frequency bands.

18 Claims, 5 Drawing Sheets

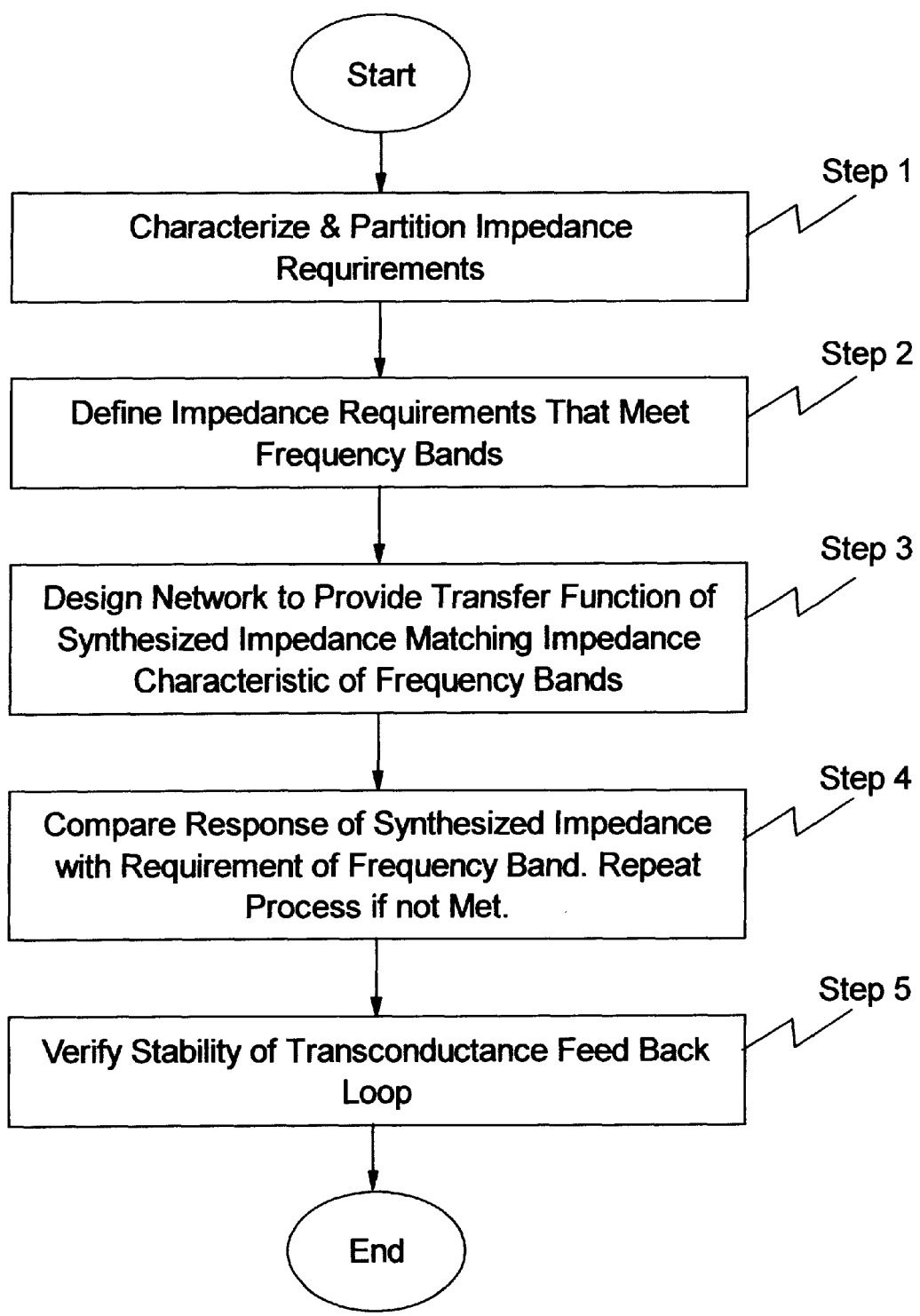

COMMUNICATION INTERFACE HAVING SYNTHESIZED MATCHING IMPEDANCES FOR DIFFERENT FREQUENCY BANDS AND A DESIGN METHOD THEREFOR

RELATED APPLICATION

Co-pending application entitled "A Communication Interface Having Combined Shaping Of Receive Response And Synthesized Matching Impedances For Different Frequency Bands And A Design Method Therefor", and assigned to the same assignee as that of the present invention.

BACKGROUND OF THE INVENTION

1. Field of Invention

This invention relates to communication interfaces and design methods therefor. More particularly, the invention relates to a reconfigurable telephone line interface having synthesized matching impedances for different frequency bands on connecting telephone lines and a design method therefor.

2. Description of Prior Art

Communication circuits, more particularly, telephone line interface circuits, are required to present a terminating impedance to voice or data signals on connecting cable pairs. The terminating impedance prevents, or at least minimizes, noise on the cable pairs in the form of reflections or echos due to mismatches between the terminating impedance of the interface circuit and the transmission impedance of the cable pair. In most countries, the terminating impedance for cable pair must meet requirements specified by a country's telephone administration. In some countries, the required terminating impedance is different in characteristic for adjacent frequency bands served by the interface circuit. Synthesis of a terminating impedance that facilitates matching the impedance requirements of different countries would simply implementations for the different countries and lead to a single circuit that could be programmed to meet the requirements of the different countries.

Recently, active filters using transconductance amplifiers with feedback have been used to synthesize a terminating impedance. Prior art related to terminating impedances for telephone interface circuits using a transconductance amplifier with feedback for matching the impedance requirement of a connecting telephone line or cable pair includes the following:

U.S. Pat. No. 5,500,894 issued Mar. 19, 1996 discloses a telephone line interface circuit with AC and DC transconductance loops for providing selectable impedances to a cable pair. The '894 patent discloses a transconductance loop with a filter network having a transfer function designed to provide a synthesized terminating impedance which may be programmed to meet the terminating impedance requirements of different telephone systems. However, '094 does not disclose a cascade of sub-filter networks to meet the terminating impedance requirements of different frequency bands on a cable pair for different countries while having little or no effect upon the other bands.

U.S. Pat. No. 4,894,864 issued Jan. 16, 1990 discloses a transconductance loop for synthesizing the terminating impedance of a cable pair. However, there is no partitioning the loop into programmable sub-filter networks providing different terminating impedances that may be required by different countries.

U.S. Pat. No. 4,381,561 issued Apr. 26, 1983 discloses impedance matching for an interface circuit using digital impedance synthesizing by a digital filter and D/A converter in a negative feedback loop to match a full duplex analog telephone line to a digital switching system. The '561 patent does not disclose a transconductance loop for synthesizing analog signals on a cable pair into matching impedances for different frequency bands.

U.S. Pat. No. 4, 359,609 issued Nov. 16, 1982 discloses an interface circuit having a feedback loop, either current or voltage controlled by which the circuit impedance can be easily set to match a telephone circuit. The '609 patent does not disclose partitioning a filter network in the loop to provide synthesized impedances matching different frequency bands on a cable pair.

U.S. Pat. No. 4,351,060 issued Sept. 21, 1982 discloses an automatic equalizing function implemented digitally using a recursive digital filter having programmable coefficients and a transconductance amplifier to provide an output impedance matching a telephone line. The '060 patent does not disclose matching a synthesized impedance to different frequency bands on a cable pair.

U.S. Pat. No. 4,961,219 issued Oct. 2, 1990 discloses synthesing an impedance across a telephone line by detecting a voltage difference across the telephone line and using an RC circuit to develop a pair of impedance output signals matching the impedance of the telephone line circuit. The '219 patent does not disclose synthesizing matching impedances to that of different telephone line circuits.

None of the prior art discloses or suggests an easily reconfigurable terminating impedance for a communication interface using a transconductance amplifier with feedback that provides different synthesized impedances for different frequency bands and, in particular, uses a notched response to separate one frequency band from another frequency band.

SUMMARY OF THE INVENTION

An object of the invention is a communication interface and design method which provides a terminating impedance matching different frequency bands occurring on a connecting communication circuit.

Another object is a telephone line interface circuit and design method using active filters including feedback loops to provide terminating impedances matching different frequency bands occurring on a connecting telephone circuit.

Another object is a reconfigurable telephone line interface circuit and design method using a transconductance amplifier and feedback loop for providing terminating impedances matching different frequency bands occurring on different connecting telephone circuits.

Another object is a telephone line interface circuit and design method using a transconductance amplifier with feedback loops including multiple feedback networks which provide matching terminating impedances for different frequency bands occurring on different connecting telephone circuits.

Another object is a telephone line interface circuit and design method using a transconductance amplifier and feedback loop including cascaded filter networks which provide a notch response to separate different frequency bands on different connecting telephone line circuits.

Another object is a standard communication interface which may be reconfigured to provide different matching impedances for different connecting communication circuits having multiple frequency bands thereon.

These and other objects, features and advantages are achieved in a telephone line interface circuit and design method providing a synthesized terminating impedance matching different frequency characteristics for received signals in different frequency bands, as required in some countries. A transconductance amplifier and feedback loop provide the terminating impedance for signals received from the telephone line and a source impedance for signals transmitted by the interface to the telephone line. Signals with different frequencies requiring different transmission impedances will generally be received from the telephone line. These different impedance characteristics are matched using different filter networks in the feedback loop. Each network provides a matching terminating impedance to the telephone line according to the frequency band applied to the telephone line. The network shapes the synthesized impedance based upon the relation $Z=1/G_mH$ where Z=the terminating impedance; $G_m$ is the transconductance of the amplifier and H is the transfer function of the feedback network. For multiple frequencies on the telephone line requiring terminating impedances with different characteristics, multiple feedback networks are included in the feedback loop. Each feedback network is designed to match the impedance requirements of a frequency band without affecting the terminating impedance and frequency band of the other frequency bands. In some instances, a notch response is provided by the filter network required to separate the frequency bands.

DESCRIPTION OF DRAWING

The invention will be further understood from a following detailed description of a preferred embodiment taken in conjunction with an appended drawing, in which:

FIG. 5 is a flow diagram for a design method which provides synthesized terminating impedances for different frequency bands occurring on a connecting telephone line circuit.

DESCRIPTION OF PREFERRED EMBODIMENT

Figure 1:
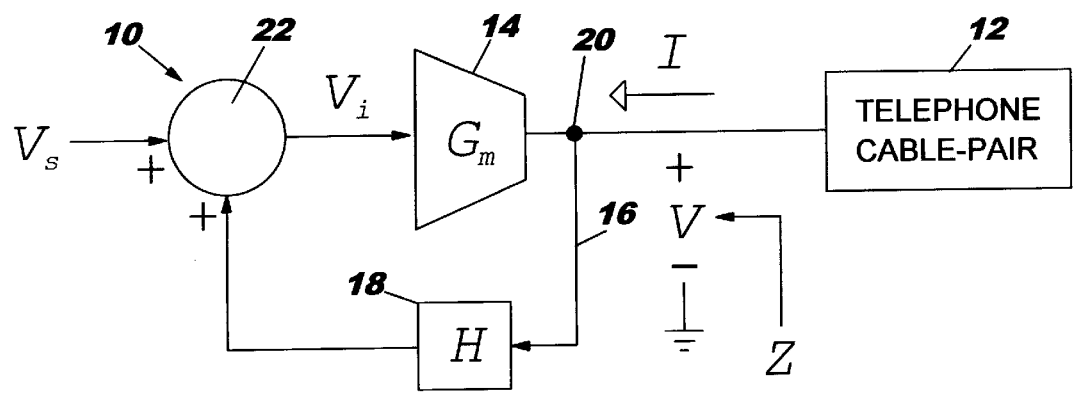
FIG. 1 is a circuit diagram of a prior art telephone line interface circuit using a transconductance amplifier and feedback loop to synthesize a terminating impedance for a connecting telephone circuit.

In FIG. 1, a prior art transconductance driver with feedback 10 provides a terminating impedance Z, looking toward the driver for a telephone cable pair 12. The driver 10 includes a transconductance amplifier 14 and feedback loop 16 including a filter network 18 having a transfer characteristic H. The feedback loop is connected between an output node 20 and an input node 22. A signal source $V_s$ is connected to node 22 which in conjunction with the feedback voltage provides $V_i$ as an input to the transconductance amplifier 14. A transconductance amplifier is described in the text "Circuits and Filters Handbook", edited by W. Chin, published by CRC Press, Boca Raton, Fla., 1995, Section 11 (ISBN 0-8493-8341-2). Such amplifiers provide an output current I equal to $G_m$, the amplifier gain, x $V_s$ the input voltage. The synthesized output impedance Z terminates the cable pair in the received direction. The impedance Z also serves as the source impedance in the transmit direction to the cable pair. The filter network 18 shapes the synthesized impedance. It can be shown that the synthesized impedance for such transconductance amplifier with feedback can be defined by Equation 1, as follows:

$Z=1/G_mH$ (under the assumption that input transfer impedance H of the network 18 is much higher than the load or transmission impedance presented by the cable pair, and where:

$G_m$ is the Gain of the amplifier 14;

H is the LaPlace transform for filter network 18.

The summing node 22 allows a signal indicated by the voltage $V_s$ to be summed with the feedback signal from the transfer network H to form the input voltage to the amplifier 14. The transfer function H must be designed such that the terminating impedance Z meets the different terminating impedance requirements of different countries.

Figure 2A:
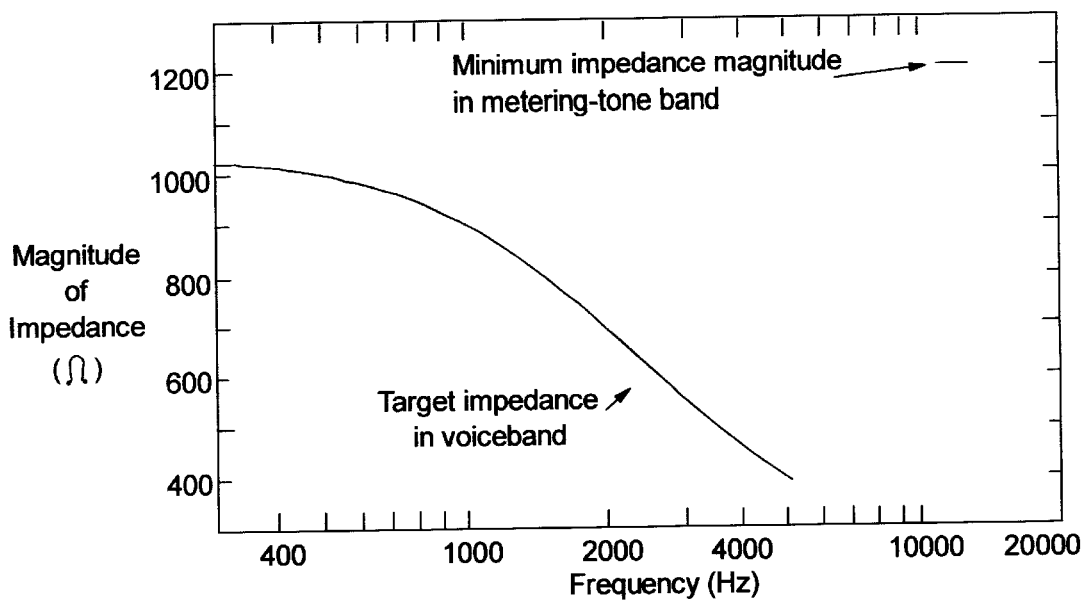
FIG. 2A is a graph of Impedance in Ohms versus Frequency in Hertz as a terminating impedance requirement in a country for a telephone line interface circuit receiving different frequency bands on the same connected telephone line.

In FIG. 2A, an example of terminating impedance requirements for one country are shown for different frequency bands. There is one terminating impedance requirement in the voice band (below 5 kHz.) and a second terminating impedance requirement for a metering-tone frequency between 11.8 kHz. and 12.2 kHz. Since a synthesized impedance Z is inversely proportional to the transfer function H (see Equation 1), the magnitude of H must increase with the frequency in voice band and then drop by at least a factor of 4 between 5 kHz. and 12 kHz. Designing a single transfer function and an associated feedback network to meet these requirements would be overly complicated and not easily reconfigurable to meet a different set of impedance requirements for other countries.

Figure 3A:
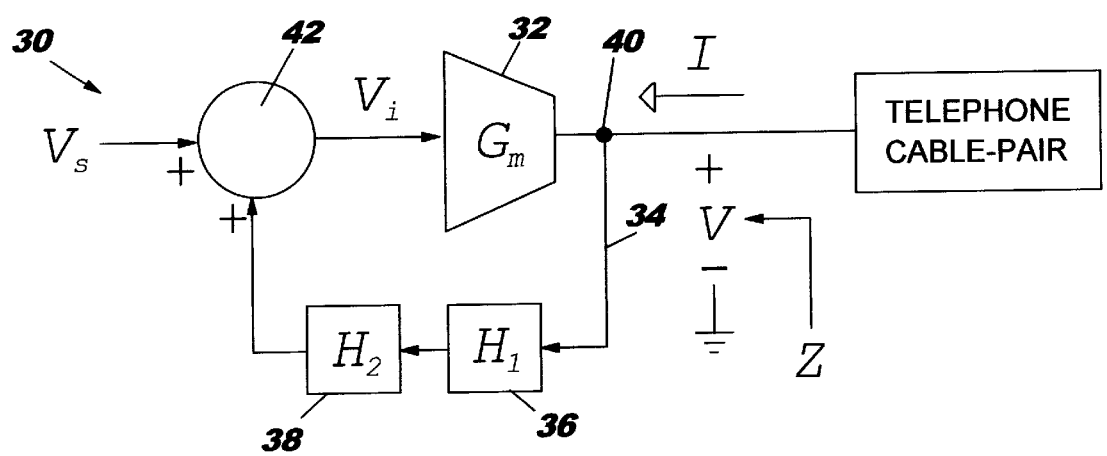
FIG. 3A is a circuit diagram of a telephone line interface circuit using a transconductance amplifier and feedback loop having cascaded filter networks to provide matching terminating impedances for different frequency bands occurring on a connecting telephone circuit and incorporating the principles of the present invention.
Figure 3B:
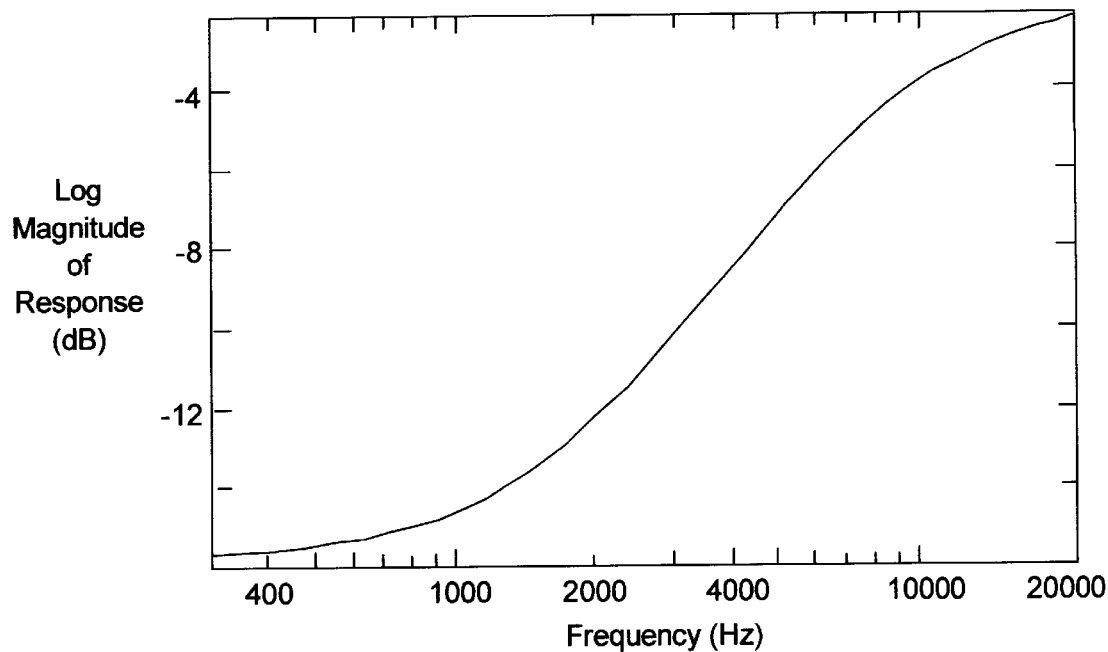
FIG. 3B is a graph of voice-band frequency response (amplitude vs. frequency) of a network H1 used to synthesize a complex termination impedance in the circuit of FIG. 3A.
Figure 3C:
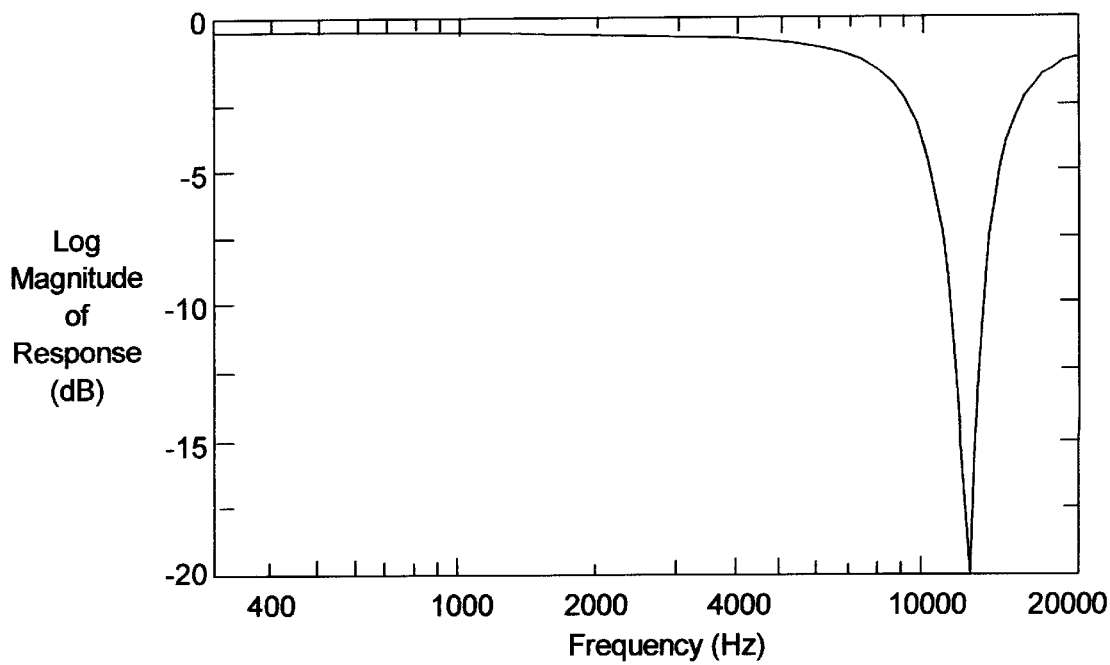
FIG. 3C is a graph of metering-tone frequency response (amplitude vs. frequency) including a notch for the telephone line interface circuit of FIG. 1.

In FIG. 3A, the present invention solves the problem described in connection with FIGS. 1 and 2A. In FIG. 3A, a transconductance driver 30 terminates the cable pair 12. The driver includes a transconductance amplifier 32 and a feedback loop 34 including cascaded sub-filter networks 36 and 38 having transfer functions $H_1$ and $H_2$, respectively. The feedback loop is connected to a node 40 at the output of the amplifier 32 and to a node 42 at the input of the amplifier 32. The node 42 also receives a signal in the form of a voltage $V_s$ which in conjunction with the feedback voltage provides a voltage $V_i$ as an input to the amplifier 32. The sub-filter networks 36 and 38 are designed to meet one of the frequency band requirements described in connection with FIG. 2A. Each filter network can be optimized to one of the required frequency bands. For example, $H_1$ is designed to match the required shape in the voice band while remaining flat in the metering-tone band as shown in FIG. 3B. Likewise, $H_2$ is designed to meet the minimum impedance requirement in the metering-tone band while remaining flat in the voice band as shown in FIG. 3C.

As described in the European Telecommunications Standards Institute (ETSI), Section 4.1.2 (CH), March 1996 it can be shown using a first order lead-lag network that the voice band can be approximated by a LaPlace Transform $H_1$ described by Equation 2, as follows:

$$H_1(s) = H_{10} \frac{\left[1 + \left(\frac{s}{\omega_z}\right)\right]}{\left[1 + \left(\frac{s}{\omega_p}\right)\right]}$$

where:

$H_1$ (s)=the LaPlace Transform $H_1$ defining the terminating impedance for the voice frequency band;

$H_{10}$=a constant scale factor of the transfer function;

$\omega_p$=pole frequency for the network; and $\omega_z$=zero frequency for the filter network.

Figure 2B:
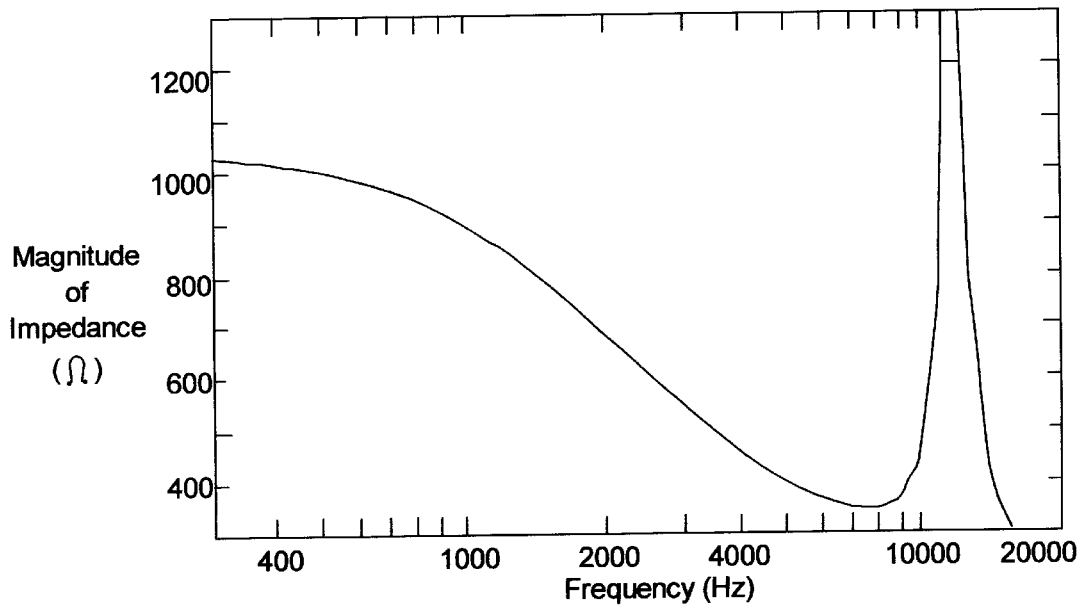
FIG. 2B is a graph of Impedance in Ohms and Frequency in Hertz for a filter having a notch response for a country having different frequency bands on the same connected telephone line.

A terminating impedance to meet a metering tone requirement must have approximately constant magnitude and phase through the voice band and thereafter the magnitude decreases sharply between 5 kHz. and 12 kHz. This can be obtained with a notch response for the higher frequencies, as shown in FIG. 2B. As described in the text "Design Of Analog Filters" by Schaumann, Ghausi and Laker, published by Prentice-Hall, Englewood Cliffs, N.J., a notch response can be approximated by a LaPlace Transform $H_2$ described by Equation 3, as follows:

$$H_2(s) = H_{20} \frac{1 + \left(\frac{s}{Q_U}\right)\left(\frac{s}{\omega_0}\right) + \left(\frac{s}{\omega_0}\right)^2}{1 + \left(\frac{s}{Q_L}\right)\left(\frac{s}{\omega_0}\right) + \left(\frac{s}{\omega_0}\right)^2}$$

where:

$H_{20}$=a constant scale factor of the notch transfer function;

$\omega_0$=the center frequency of the notch response for the metering tone frequency;

$Q_U$=unloaded Q of the notch, which is related to the ratio of the maximum energy stored to the energy lost in the filter $H_2$; and $Q_L$=loaded Q of the notch, which is related to the ratio of the maximum energy stored to the energy lost in the filter $H_2$.

Note: The depth of the notch (i.e., how much attenuation is provided at the notch frequency) is related to the ratio $Q_L$ to $Q_U$.

The overall gain constant of H which is the product of $H_{10} \cdot H_{20}$ must be adjusted at the end of the process to take into account the transconductance $G_m$ (assumed to be an independent frequency) in meeting the overall terminating impedance requirements for the different frequency bands.

The partitioning of the filter network H as a cascade of sub-networks, each network addressing the requirements of a particular frequency band, simplifies the process of ensuring that the feedback load loop is stable. Any modifications to the overall transfer function H resulting from the initial synthesis procedure, for example, the product of $(H_{10} \cdot H_{20})$ must be made to guarantee stability can be considered with respect to the individual subnetwork responses independently. Accordingly, tradeoffs can be made between meeting impedance requirements and guaranteeing stability in an efficient and intelligent manner.

Figure 4:
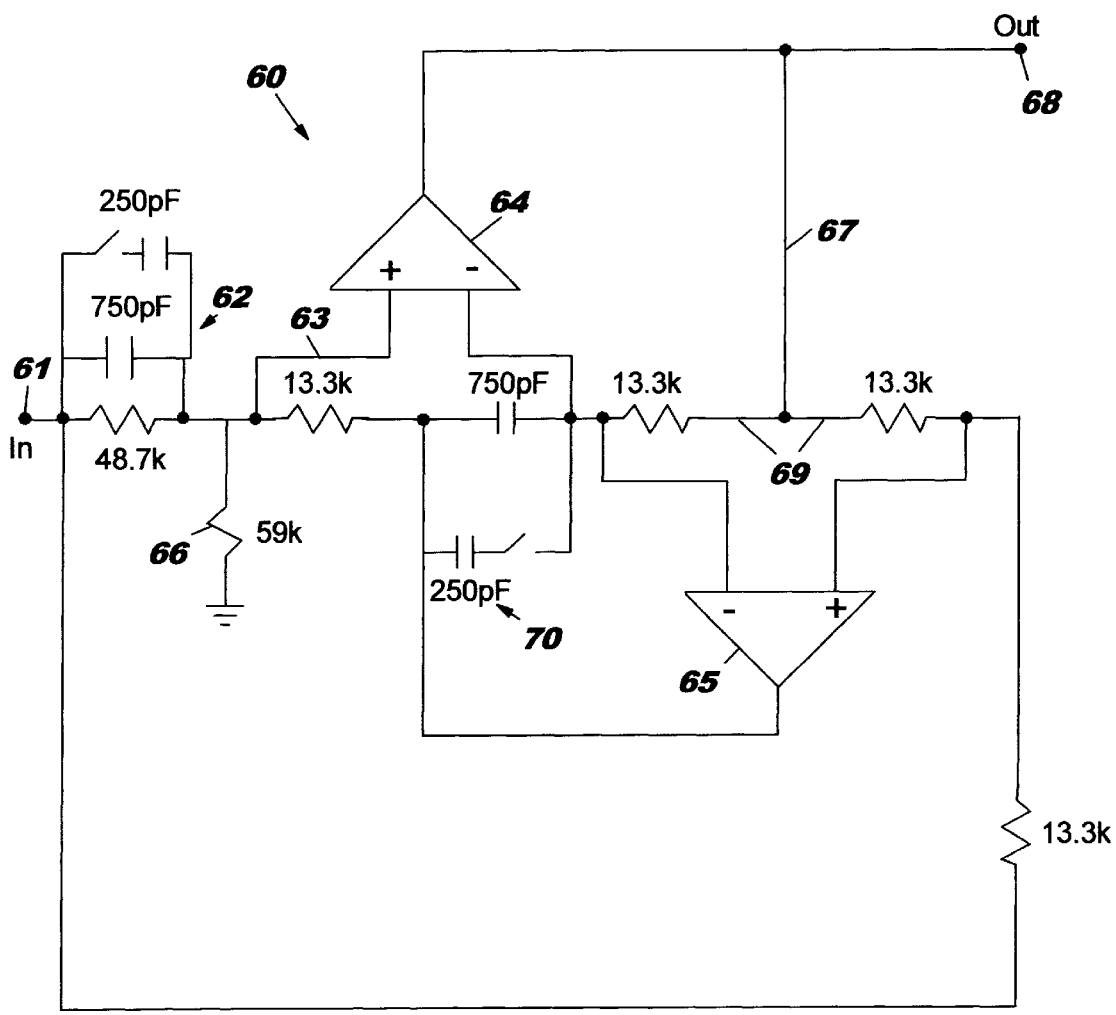
FIG. 4 is a circuit diagram of a programmable filter unit for the circuit of FIG. 3A.

The cascaded sub-filter networks 36 and 38 may be programmable by the inclusion of switches to add or delete capacitance and/or resistance to the filter. In FIG. 4, one implementation of a filter 60, programmable as an H2 notch filter, includes an input circuit 61 coupled through an RC circuit and switch 62 to a plus side 63 of an operational amplifier 64 and through a resistor to a plus side of an operational amplifier 65. The side 63 is also connected to a reference potential or ground through a resistor 66. The output of the amplifier 64 is connected to an output terminal 68 and to a feedback loop 67 including the operational amplifier 65. The loop 67 is connected through like resistors 69 to plus and minus sides of the amplifier 65, the output of which is provided to the plus and minus sides of the amplifier 64 through an RC circuit and switch 70.

The filter 60 can be programmed by simply switching two capacitors. With the switches in the RC circuits closed in the RC circuits 62 and 70, the filter 60 has a center frequency of 12 kHz; with the switches open, the filter has a center frequency of 16 kHz. The other characteristics of the notch filter (depth and width of the notch, and transmission away from the notch) are not affected by the switching of these capacitors. Additionally, the characteristics of the overall synthesized impedance and voiceband, which is determined by the network H2×H1, is not affected by this programming. Of course, the switches in the RC circuits 62 and 70 can be implemented in a variety of devices. For example, they may be solid state and need not be physical switch contacts.

The filter 60 meets the impedance requirements for the metering-tone band in Switzerland. Such metering-tone band is centered at 12 kHz. In Germany, a metering-tone is used with its band is centered at 16 kHz. However, the impedance requirements of Germany in the voiceband (up to 4 kHz.) is essentially the same as that for Switzerland. With the transconductance feedback partitioned into two networks, one controlling the shaping of the synthesized impedance in the voiceband and the other controlling the shaping of the synthesized impedance in a metering-tone band, the latter can be programmed to a notch centered at either the Switzerland metering-tone frequency of 12 kHz. or the Germany metering-tone frequency of 16 kHz.

In FIG. 5, a design method for determining the terminating impedance requirements for different frequency bands comprises the following steps:

Step 1: Characterize and partition the impedance requirements vs. frequency using Equations 1, 2 and 3 described above. Step 1 identifies the frequency bands within which separate approximations will be carried out. In some cases, the identification is straight-forward given the requirement; the Switzerland impedance requirement used as an example falls in this category. In other cases, the identification may not be so obvious and an iterative, trial-and-error procedure may be needed (see Step 4 below).

Step 2: For each frequency band in the partition resulting from step 1, define an impedance characteristic that meets the specified impedance requirement within the given frequency band, and is constant vs. frequency outside the given frequency band. The overall impedance characteristic will be the product of these individual impedance characteristics, and so the constants are chosen such that the overall characteristic meets the specified impedance requirements across all the bands. Note: In the Switzerland example, there are two bands identified, with a relatively wide frequency range between them in which no requirement is specified. In addition, the "metering tone" band is very narrow and the requirement specified therein is for a minimum impedance level. It is known that a response can be created that has a peak exceeding some minimum value in a narrow frequency band while being approximately constant at unity outside this frequency band. Thus, for this example, the constant value of the "out of band" response of the metering-tone impedance characteristic can be taken to be unity, and the "out of band" constant response of the voiceband impedance characteristic can be taken to be equal to the value of the characteristic at the upper end of the voiceband (about 4 kHz).

Step 3: For each frequency band in the partition, a network is designed whose transfer function approximates the inverse of the impedance characteristic within the given band, and the appropriate constant outside the band. The networks are connected in cascade (in FIG. 3A, two networks $H_1$ and $H_2$, because have two bands of interest. However, in general, there may be more than two networks if there are more than two bands, and the overall synthesized impedance characteristic is computed as $(1/G_m * H_1 * H_2 * \ldots * H_N)$ where N is the number of bands and thus of networks. The constant scale factors associated with each network (which are associated with the out-of-band constant value for the given network) may be adjusted, together with the constant transconductance value $G_m$ of the transconductance amplifier.

Step 4: Compare the overall response of the synthesized impedance characteristic with the requirement. If the requirement is met, the design process is completed. If not, a different partition of the required characteristic vs. frequency is attempted and the process returns to step 2, or a different assignment of out-of-band constant values can be taken given the original partition and the process returns to step 3.

Step 5: Verify the stability of the transconductance feedback loop taking into account the open-loop behavior of the transconductance amplifier and any op amps employed in the filter networks H1, H2, etc. If the stability margin, as determined for example in terms of loop gain margin and phase margin, is inadequate, the transfer functions of one or more of the subnetworks is modified such that the impedance requirements are met and the stability margin is adequate. In the Switzerland example, it was this stability consideration that led to limiting the notch depth to 10% (ratio of "loaded Q" to "unloaded Q" of 0.1).

The process is independent of the technology used to implement the networks H1 and H2 (and additional filters, if appropriate). The notch filter implementation is a continuous-time analog active filter. Implementations in switched-capacitor technology are available, and may be preferable in some cases because they are easily programmed (the switches shown in the notch filter example would be inherently included in a switched-capacitor version). Implementations are also available in digital filter technology using the principles of the present invention.

While the invention has been shown and described in conjunction with a preferred embodiment, various changes may be made therein without departing from the spirit and scope of the invention as defined in the appended claims, in which:

We claim:

1. A reconfigurable communication interface providing synthesized impedances matching different frequency bands on different connecting communication circuits, comprising;
   a) a transconductance amplifier including an input terminal and an output terminal coupled to the communication circuit;
   b) a feedback loop coupling the output and the input terminals of the amplifier;
   c) a signal source connected to the input terminal; and
   d) a filter network in the feedback loop providing synthesized terminating impedances matching the impedance requirements of the different frequency bands on a connecting communication circuit.

2. The interface circuit of claim 1 wherein the frequency bands include voice signals and metering tones and the interface circuit further comprises:
   a) means in the filter network for matching the impedance requirement of the metering tones in a first frequency range while matching the impedance requirement of the voice signals in a second frequency range.

3. The interface circuit of claim 1 wherein the filter circuit is partitioned into sub-filter networks, each network matching the impedance requirement of a frequency band without affecting the impedance requirement of the other network.

4. The interface circuit of claim 1 wherein the filter provides a notch response for a frequency band.

5. The interface circuit of claim 1 wherein the filter has a synthesized terminating impedance and provides a source impedance for signals transmitted by the interface to the communication circuit.

6. The interface circuit of claim 1 further comprising;
   a) means for forming the filter network into a cascade of sub-filter networks, each sub-filter network having a transfer function matching a discrete frequency in the frequency bands on the communication circuit.

7. The interface circuit of claim 1 further comprising:
   a) means for optimizing the transfer function of each sub-filter network to match the requirements of a discrete frequency band while having an essentially flat response to the other discrete frequency bands.

8. The interface circuit of claim 3 further comprising:
   a) means for connecting the sub-filter networks wherein the transfer function for the feedback loop is the product of the transfer functions of the sub-filter networks.

9. The interface circuit of claim 1 further comprising;
   a) means for programming the filter network to provide terminating impedances matching the impedance requirements of the frequency bands.

10. In a telephone system including a transconductance amplifier, a feedback loop including a filter network, and a connecting telephone line thereto having different frequency bands thereon, a method of synthesizing terminating impedances matching the different frequency bands on the connecting telephone line and serving as a source impedance for signals transmitted by the amplifier to the telephone line, comprising the steps of:
    a) partitioning the filter network into sub-filter networks in the feedback loop; and
    b) designing each filter network to have an impedance matching a different frequency band on the telephone line.

11. The method of claim 10 further comprising the step of:
    a) connecting the sub-filters in cascade.

12. The method of claim 10 further comprising the step of:
    a) reconfiguring the filter network to provide matching terminating impedances for different frequency bands on different telephone lines.

13. The method of claim 10 further comprising the step of:
    a) programming the filter network to provide matching terminating impedances for different frequency bands on different telephone lines.

14. The method of claim 1 further comprising the step of
    a) providing a notch response for the filter network.

15. The method of claim 1 wherein the filter network provides a synthesized terminating impedance which is the product of transfer functions for sub-filters.

16. The method of claim 11 wherein a sub-filter is defined by the following equation:

where:

$$H_1(s) = H_{10} \frac{\left[1 + \left(\frac{s}{\omega_z}\right)\right]}{\left[1 + \left(\frac{s}{\omega_p}\right)\right]}$$

$H_1(s)$=the LaPlace Transform $H_1$ defining the terminating impedance for the voice frequency band;
$H_{10}$=a constant scale factor of the transfer function;
$\omega_p$=pole frequency for the network; and
$\omega_z$=zero frequency for the filter network.

17. The method of claim 11 wherein a sub-filter is defined by the following equation:

$$H_2(s) = H_{20} \frac{1 + \left(\frac{s}{Q_U}\right)\left(\frac{s}{\omega_0}\right) + \left(\frac{s}{\omega_0}\right)^2}{1 + \left(\frac{s}{Q_L}\right)\left(\frac{s}{\omega_0}\right) + \left(\frac{s}{\omega_0}\right)^2}$$

where:
$H_{20}$=a constant scale factor of the notch transfer function;
$\omega_0$=the center frequency of the notch response for the metering tone frequency;
$Q_U$=unloaded Q of the notch, which is related to the ratio of the maximum energy stored to the energy lost in the filter $H_2$; and
$Q_L$=loaded Q of the notch, which is related to the ratio of the maximum energy stored to the energy lost in the filter $H_2$.

18. A design method for a terminating impedance in a transconductance amplifier feedback loop, the terminating impedance matching different frequency bands on a telephone line, comprising the steps of:

a) characterizing and partitioning the terminating impedance requirements for each frequency band on the telephone line:

b) for each frequency band in the partition resulting from step 1, define an impedance characteristic that meets a specified impedance requirement within a given frequency band, and is constant vs. frequency outside the given frequency band;

c) choosing the constants such that the overall impedance characteristic meets the specified impedance requirements across all the frequency bands;

d) for each frequency band in the partition, design one or more sub-networks whose transfer function approximates the inverse of the impedance characteristic within the given band, and the appropriate constant outside the band;

e) comparing the overall response of the synthesized impedance characteristic with the requirement, if the requirement is met, the design process is completed; otherwise steps 1–4 are repeated using a different partition of the required characteristic vs. frequency or a different assignment of out-of-band constant values are selected given the original partition of step 1, after which the process returns to step 3; and f) verifying the stability of the transconductance feedback loop taking into account the open-loop behavior of the transconductance amplifier; if the stability margin is inadequate, the transfer functions of one or more of the sub-networks is modified such that the impedance requirements are met and the stability margin is adequate.

* * * * *